United States Patent [19]

Toyama

[11] Patent Number: 5,025,699

[45] Date of Patent: Jun. 25, 1991

[54] FINGER REST FOR RECORDER

[76] Inventor: Toshiko Toyama, 2-39-1, Sakuragaoka, Tama-shi, Tokyo, Japan

[21] Appl. No.: 436,511

[22] Filed: Nov. 14, 1989

[30] Foreign Application Priority Data

Nov. 16, 1988 [JP] Japan .......................... 63-149453[U]
Jan. 25, 1989 [JP] Japan .................................. 1-15582
Jan. 27, 1989 [JP] Japan ............................... 1-20924[U]

[51] Int. Cl.$^5$ ............................................. G10D 9/00
[52] U.S. Cl. .................................... 84/453; 84/380 C
[58] Field of Search ................. 84/380 R, 380 C, 453

[56] References Cited

U.S. PATENT DOCUMENTS

| | | | |
|---|---|---|---|
| 2,933,968 | 4/1960 | Hearne | 84/380 R |
| 3,363,497 | 1/1968 | Thompson | 84/380 C |
| 3,363,498 | 1/1968 | Uebel et al. | 84/380 C |
| 3,599,526 | 8/1971 | Sollecito et al. | 84/384 |
| 4,763,556 | 8/1988 | Peplowski | 84/384 |

FOREIGN PATENT DOCUMENTS 62-32309 8/1987 Japan .

Primary Examiner—Lawrence R. Franklin
Attorney, Agent, or Firm—Frishauf, Holtz, Goodman & Woodward

[57] ABSTRACT

A finger rest for a recorder, which is attached on the under side of a body of the recorder for facilitating support of the weight of the recorder body with a thumb of the right hand of a player, comprises a body holding section having a bottom portion of a predetermined length in the longitudinal direction of the recorder body and side portions on both sides of the bottom portion; and a thumb supporting section projecting from the holding section downward in the direction perpendicular to the longitudinal direction of the body holding section. The body holding section has a cross section in the form of an arc so as to engage the outer periphery of the recorder body with a spring force. The arc is a major arc having a circumference longer than that of a half circle. When the finger rest is engaged over the outer periphery of the recorder body, the thumb of the right hand of a player can be stably supported on the downwardly projecting thumb supporting section to thereby facilitate movement of other fingers which are used to open/close ring keys. The finger rest may be freely adjusted positionally by moving it along the length of the recorder body to suit a player.

35 Claims, 2 Drawing Sheets

FINGER REST FOR RECORDER

BACKGROUND OF THE INVENTION AND RELATED ART STATEMENT

This invention relates to a finger rest for a recorder, and more particularly to a finger rest molded of synthetic resin for recorders to be used at schools which can be attached at a part of the recorder and which school children can use for resting their thumbs thereon for easily and securedly supporting the recorder while playing the same.

Among various woodwind instruments, recorders molded of synthetic resin are widely and popularly used in music lessons given in schools all over the world. While playing a recorder, the instrument is held by the fingers of both hands. A player supports the recorder with a thumb of his/her right hand from the under side while opening/closing keys on the surface side. As the technique of a player progresses, the action of opening/closing the ring keys with fingers becomes smoother. If the position of the thumb of the right hand which supports the body from underneath is secured by supporting the thumb with a finger rest attached on the body, the action of opening/closing the ring keys with other fingers is extremely facilitated to thereby accelerate technical progress. If a finger rest is provided on the under side or the reverse side of a body of a recorder to support the right hand thumb which holds the instrument, it would be extremely effective as an aid not only for beginners but also advanced students.

There have been known various finger supports or rests for the main body of a woodwind instrument for stabilizing it which are either fixed with screws or by soldering, particularly for brass instruments. As a recorder is made of synthetic resin, it is possible to provide a finger rest by which a thumb is supported on a part of the main body of the recorder when the recorder is molded in the manufacturing process as an integral projection. However, as recorders of this type are mainly used for educational purposes by school children who are still in the process of development, finger rests or supports fixed at a predetermined position would be inconvenient in that the position thereof cannot be varied afterward nor freely selected along with the growth of children. It is particularly inconvenient since the optimal position of such rests or supports changes with advance in age or the size of the player's hands.

In order to overcome such inconveniences, there has been proposed a finger rest for a recorder for educational purposes which is manufactured separately from the main body of the recorder and attached provisionally on a part of the main body so that a player can select the fixing position optimal to him/her and fix the rest on the body with adhesives (Japanese Utility Model Publication Sho 62-32309). But as the finger rest is to be fixed at a position after such position is selected, such attaching process involves steps too cumbersome and complicated for young school children. Moreover, the rest cannot always be attached properly, and even if it is fixed desirably, it cannot be adjusted along with the growth of the player, since it is firmly fixed with the adhesive.

SUMMARY OF THE INVENTION

This invention aims to overcome the problems encountered in the prior art finger rests and to provide a finger rest which can easily be attached on the main body of a recorder even by young school children and which can be adjusted in the fixing position even after it is attached. The finger rest according to this invention is preferably molded from synthetic resin and comprises a body holding section having a bottom which extends for a predetermined length in the longitudinal direction of the body of the recorder and sides on both sides of the bottom, and a thumb supporting section which projects from the holding section in the direction perpendicular to the length of the recorder. When viewed from the cross section of the body, the body holding section has the configuration of a semi-arc, and can tightly and firmly hold the outer circumference of the body of the recorder with the semi-arc and the bottom in a spring fashion. The inner diameter of the semi-arc including said bottom is made slightly smaller than the outer circumference of the body, and the length of the arc including the bottom forms a major arc or is longer than one half arc of a circle.

The finger rest according to this invention can be fixed on the body of a recorder by placing the holding section at the position for fixing on the body from underneath in a manner to hold the body on the outer circumference thereof with both sides of the section. When said holding section is engaged on the outer circumference of the body of a recorder, as the inner diameter of the section is slightly smaller than the outer diameter of the body, the body is firmly sandwich with sides of the section with a spring force to properly fix the finger rest at the position. Such firm and tight holding force of the section exerted on the body effectively helps the support of the weight of the body of the recorder with a thumb. Further, as the holding section has a major arc in section thereof on the inner side which is larger than one half arc of a circle, once the section is placed over the outer periphery of the body with the arc somewhat expanding outward, it seldom slips off from the body in the inserting direction unless the arc is expanded again. The holding section is yet freely slidable forward and backward along the longitudinal direction of the body with friction exerted against the outer periphery of the body thereby maintaining an appropriate rigidity. Therefore, even after the holding section is mounted on the outer periphery of the body, if one wishes to move the position for setting the thumb rest, he/she can easily change the attaching position to any desired position.

BRIEF DESCRIPTION OF THE DRAWINGS

Other objects and advantages of this invention will become apparent when taken in conjunction with description hereinbelow of some embodiments shown in the accompanying drawings.

DETAILED DESCRIPTION OF PREFERRED EMBODIMENT

Figure 1:
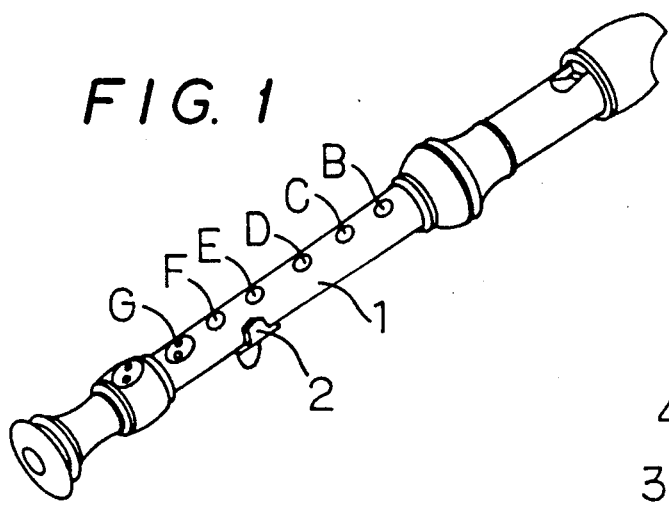
FIG. 1 is a perspective view of a recorder when attached with a finger rest according to this invention.

FIG. 1 shows a synthetic resin recorder 1 for school children to which a finger rest 2 according to this invention is attached at a predetermined attachment position. The finger rest 2 is preferably attached at a position underneath the body 1 in the range corresponding from the fourth ring key E to the sixth ring key G of the plural ring keys B through G opening on the upper side of the body 1, and preferably at a position corresponding to the fifth ring key F.

Figure 2:
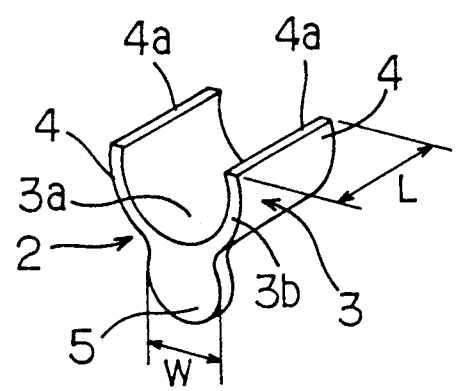
FIG. 2 is a perspective view to show the configuration of the finger rest.
Figure 3:
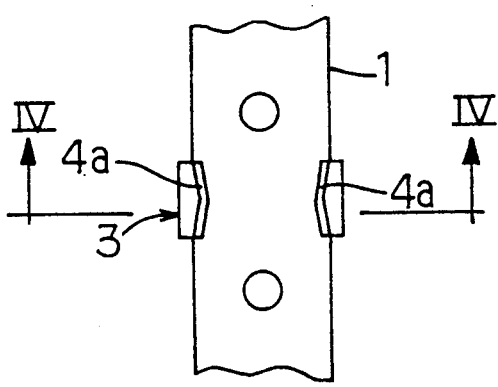
FIG. 3 is a partial plan view to show a body of the recorder which is mounted with a finger rest.
Figure 4:
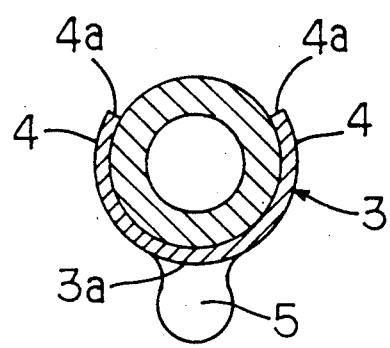
FIG. 4 is a cross sectional view to show the body in FIG. 3 along the line IV—IV.

The finger rest 2 comprises basically a body holding section 3 which has a section of a major arc to hold a recorder body 1 with spring force on the outer periphery thereof as shown in FIG. 2, and a thumb supporting section 5. The holding section 3 comprises a bottom 3a which has a predetermined length L in the longitudinal direction of the body 1 and sides 4 which extend upward respectively from both sides of the bottom 3a. The sides form opposing arcs when viewed from the cross sectional direction of the body 1 so that they tightly abut on the outer periphery of the body 1 together with the bottom 3a and hold the same firmly. The inner diameter of the arc formed with the side surfaces 4 and the surface of the bottom 3a has a dimension slightly less than the outer diameter of the body at the attachment position. The inner diameter formed on the insides of the arc sides 4 and the bottom 3a has an arc slightly longer than an arc of a half circle and has a cross section in the form of a major arc with the upper end lines 4a extending upward along the arc of the sides 4. When attached on the outer periphery of the body 1, the holding section 3 can tightly abut against the outer periphery of the body 1 with a spring force inherent thereto and hold the same from both sides quite firmly as the section has an inner diameter slightly smaller than the outer periphery of the body 1 and as it has a section in the form of a major arc with the upper end lines 4a of the sides 4 extending upward.

The thumb supporting section 5 which projects downward from the holding section 3 comprises a plate having a predetermined width W and formed in the direction perpendicular to the longitudinal direction of the holding section 3. The position from which the supporting section 5 projects may be any position as long as it is on the under side of the holding section 3, but in FIG. 2 the supporting section 5 is provided at a position underneath the holding section 3 at an end 3b. When the holding section 3 is tightly engaged with the body 1 on the outer periphery thereof and the thumb supporting section 5 comes substantially to project from the under side of the body 1, the weight of the body 1 can be supported via the section 5 by a thumb of the right hand of a player positioned under the supporting section 5.

Figure 5:
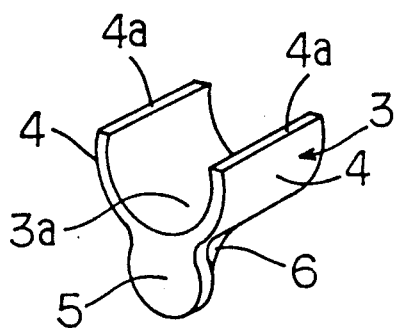
FIGS. 5 through 10 are perspective views to show other embodiments of the finger rest according to this invention.
Figure 6:
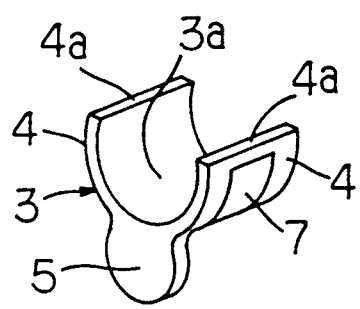

If a rib 6 is provided between the back of the thumb supporting section 5 and the bottom 3a of the holding section 3 as shown in FIG. 5, it would advantageously reinforce the thumb supporting section 5. If a metal leaf spring 7 which is curved in a major arc is integrally adhered to the outer periphery of the holding section 3 as shown in FIG. 6, it would conveniently reinforce holding section 3 and enhance the spring force exerted on the body 1 as well.

Figure 7:
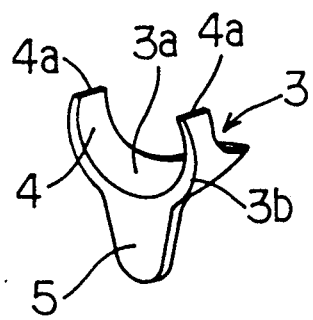
Figure 8:
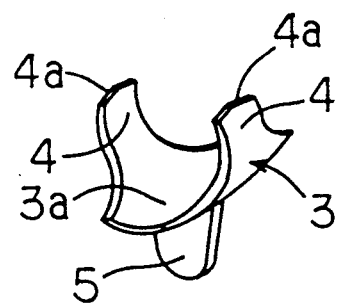

The finger rests shown in FIGS. 7 and 8 have the upper sides 4a of the sides 4 which are shorter than the bottoms 3a. In the finger rest shown in FIG. 7, the holding section 3 is slanted at both sides on an end opposing the end 3b from which the thumb supporting section 5 projects so as to shorten the upper sides 4a on both sides 4. In the finger rest shown in FIG. 8, the thumb supporting section 5 is made to project from the holding section 3 at the center of the bottom surface 3b, and the section 3 is slanted on both ends thereof to leave the central parts in the shape of a bell.

It would be advantageous if the upper sides 4a of the holding section 3 are shortened on both sides thereof as shown in the finger rests shown in FIGS. 7 and 8, considering the fact that the recorder body 1 is formed generally like a cone and therefore the outer periphery differs slightly depending on the position. In other words, if the finger rest has long upper sides 4a on the holding section 3 as shown in FIG. 2, strictly speaking, the inner periphery of the side surfaces 4 may not always be abutted snugly and uniformly on the outer periphery of the body 1. But if the holding section 3 of the finger rest is shortened on upper sides 4a on both sides, it would uniformly and tightly abut against the outer periphery of the body 1 to provide a suitable hold. Moreover, as the shorter upper sides 4a facilitate attachment/detachment of the holding section 3 on or off of the body 1 requiring less power, children can easily perform the operating.

Figure 9:
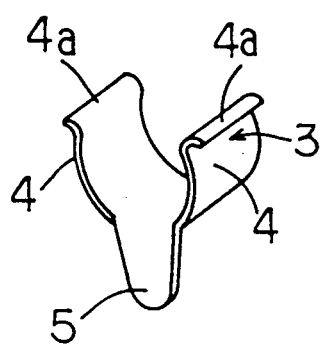
Figure 10:
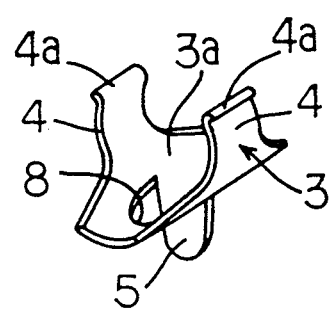

FIGS. 9 and 10 show modified shapes of finger rests which are made by bending a metal sheet. If the upper sides 4a of the holding section 3 are curved outward to have rounded lips on both sides as shown in FIG. 9, it would further facilitate insertion of the section 3 onto the body 1. The bottom 3a of the holding section 3 may be notched in the form of the letter U as shown in FIG. 10 and bent downward to provide the thumb support section 5.

Figure 11:
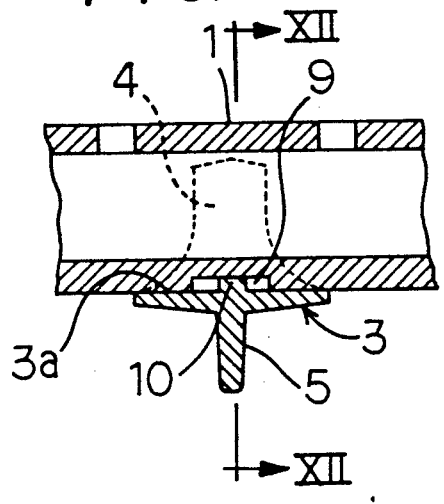
FIG. 11 is a cross section to show a still another embodiment of the finger rest on a body.
Figure 12:
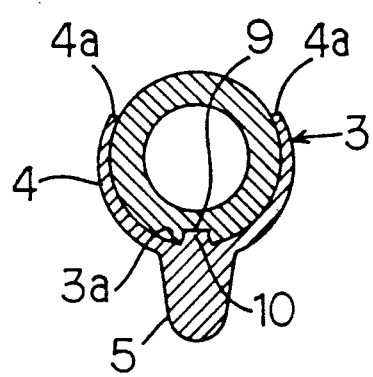
FIG. 12 is a cross sectional view of the body shown in FIG. 11 along the line XII—XII.

As shown in FIGS. 11 and 12, the body 1 may be recessed to have a groove 9 longitudinally at the attachment position, and the holding section 3 of the finger rest may be provided with a projection 10 on the inner periphery which fits with the groove 9 so that when the section 3 is engaged with the body 1, the projection 10 may be fitted into the groove 9. In the above mentioned structure, as the section 3 may be moved in the longitudinal direction of the body 1 while the projection 10 is being engaged with the groove 9, positional adjustment may be achieved more effectively and stably without rotation of the section 3 around the body to prevent deviation of the thumb supporting section 5. Although the projection 10 is provided on the holding section 3 while the groove 9 is recessed on the body 1 in the embodiments shown in FIGS. 11 and 12, the projection may be provided on the body while the groove is recessed on the section 3.

Description has been made of the embodiments of the finger rest which are molded of synthetic resin or made of metal, but it may be made of rubber or the like.

What is claimed is:

1. A finger rest for a recorder having an elongated recorder body, the finger rest comprising:
    a body holding section having a bottom portion extending a predetermined length in the longitudinal direction of the recorder body, and respective side portions extending from said bottom portion on both sides of said body holding section;

a thumb supporting section projecting from said body holding section downward in a direction substantially perpendicular to said longitudinal direction of said recorder body and of said body holding section;

said body holding section having a sectional shape in the form of an arc when viewed in the cross sectional direction of said recorder body so as to hold said recorder body firmly and tightly with a spring force;

at least a portion of said body holding section being resilient, and said body holding section having an inner diameter smaller than the outer diameter of said recorder body, an arc extending over the inner surfaces of said bottom portion and said side portions being a major arc which is larger than the length of a half circle;

said thumb supporting section comprising a plate-like member which has a plane substantially parallel to the cross section of said arc section of said body holding section; and said plate-like member having a width W so as to extend the bottom portion of said body holding section and over to said two side portions of said body holding section which define said arc section.

2. The finger rest for a recorder as claimed in claim 1, wherein said thumb supporting section projects from an end portion of said body holding section.

3. The finger rest for a recorder as claimed in claim 2, wherein the length of upper sides of said body holding section on both side portions is shortened compared to the length of said bottom portion of said body holding section by slantingly inclining said upper sides at an end opposing the end from which the thumb supporting section projects.

4. The finger rest for a recorder as claimed in claim 1, wherein said body holding section comprises a rib coupled between a bottom portion of said body holding section and a back surface portion of said thumb supporting section.

5. The finger rest for a recorder as claimed in claim 1, wherein said body holding section comprises a metal leaf spring integrally attached on an outer periphery of said body holding section, said metal leaf spring being curved as an arc.

6. The finger rest for a recording as claimed in claim 1, wherein said thumb supporting section projects from a central portion of said bottom portion of said holding section, and the upper sides of said body holding section are slantingly inclined on both side portions to leave the rest of said body holding section in a bell shape.

7. The finger rest for a recorder as claimed in claim 6, wherein upper longitudinally extending portions of said body holding section are curled outward to have respective rounded lips.

8. The finger rest for a recorder as claimed in claim 1, wherein upper longitudinally extending portions of said body holding section are curled outward to have respective rounded lips.

9. The finger rest for a recorder as claimed in claim 1, wherein said bottom portion of said body holding section has a notched portion in the shape of a U-shaped recess, and the inside of said notched portion is bent downward to form said thumb supporting section.

10. The finger rest for a recorder as claimed in claim 1, wherein said finger rest, including said body holding section and said thumb supporting section are made of a synthetic resin material.

11. A finger rest for a recorder having an elongated recorder body, the finger rest comprising:

a body holding section having a bottom portion extending a predetermined length in the longitudinal direction of the recorder body, and respective side portions extending from said bottom portion on both sides of said body holding section;

a thumb supporting section projecting from said body holding section downward in a direction substantially perpendicular to said longitudinal direction of said recorder body and of said body holding section;

said body holding section having a sectional shape in the form of an arc when viewed in the cross sectional direction of said recorder body so as to hold said recorder body firmly and tightly with a spring force;

at least a portion of said body holding section being resilient, and said body holding section having an inner diameter smaller than the outer diameter of said recorder body, an arc extending over the inner surfaces of said bottom portion and said side portions being a major arc which is larger than the length of a half circle;

a groove provided longitudinally on at least a portion of one of said recorder body and said body holding section at a position where said body holding section is to be attached to said recorder body; and a projection provided on the other of said recorder body and said body holding section so as to fit into said groove when said finger rest is mounted on said recorder body.

12. The finger rest for a recorder as claimed in claim 11, wherein said groove and said projection are provided at the bottom or rear portion of said recorder body.

13. The finger rest for a recorder as claimed in claim 12, wherein:

said groove is provided on a bottom or rear surface portion of said recorder body; and said projection is provided on an inner surface portion of said body holding section.

14. The finger rest for a recorder as claimed in claim 11, wherein:

said groove is provided on a bottom or rear surface portion of said recorder body; and said projection is provided on an inner surface portion of said body holding section.

15. The finger rest for a recorder as claimed in claim 11, wherein:

said groove extends in the longitudinal direction of said recorder body; and said projection has a longitudinal dimension less than the length of said groove so as to be received in said groove at different positions along the length of said groove to adjust the position of said body holding section along the longitudinal direction of said recorder body.

16. The finger rest for a recorder as claimed in claim 11, wherein:

said thumb supporting section comprises a plate-like member which has a plane substantially parallel to the cross section of said arc section of said body holding section; and said plate-like member has a width W so as to extend over the bottom portion of said body holding section and over to said two side portions of said body holding section which define said arc section.

17. The finger rest for a recorder as claimed in claim 11, wherein said thumb supporting section projects from an end portion of said body holding section.

18. The finger rest for a recorder as claimed in claim 17, wherein the length of upper sides of said body holding section on both side portions is shortened compared to the length of said bottom portion of said body holding section by slantingly inclining said upper sides at an end opposing the end from which the thumb supporting section projects.

19. The finger rest for a recorder as claimed in claim 11, wherein said body holding section comprises a rib coupled between a bottom portion of said body holding section and a back surface portion of said thumb supporting section.

20. The finger rest for a recorder as claimed in claim 11, wherein said body holding section comprises a metal leaf spring integrally attached on an outer periphery of said body holding section, said metal leaf spring being curved as an arc.

21. The finger rest for a recording as claimed in claim 11, wherein said thumb supporting section projects from a central portion of said bottom portion of said holding section, and the upper sides of said body holding section are slantingly inclined on both side portions to leave the rest of said body holding section in a bell shape.

22. The finger rest for a recorder as claimed in claim 21, wherein upper longitudinally extending portions of said body holding section are curled outward to have respective rounded lips.

23. The finger rest for a recorder as claimed in claim 11, wherein upper longitudinally extending portions of said body holding section are curled outward to have respective rounded lips.

24. The finger rest for a recorder as claimed in claim 11, wherein said bottom portion of said body holding section has a notched portion in the shape of a U-shaped recess, and the inside of said notched portion is bent downward to form said thumb supporting section.

25. A finger rest for a recorder having an elongated recorder body, the finger rest comprising:
a body holding section having a bottom portion extending a predetermined length in the longitudinal direction of the recorder body, and respective side portions extending from said bottom portion on both sides of said body holding section;
a thumb supporting section projecting from said body holding section downward in a direction substantially perpendicular to said longitudinal direction of said recorder body and of said body holding section;
said body holding section having a sectional shape in the form of an arc when viewed in the cross sectional direction of said recorder body so as to hold said recorder body firmly and tightly with a spring force;
at least a portion of said body holding section being resilient, and said body holding section having an inner diameter smaller than the outer diameter of said recorder body, an arc extending over the inner surface of said bottom portion and said side portions being a major arc which is larger than the length of a half circle;
said body holding section having a projection on a portion thereof where said body holding section attaches to said recorder body; and
said recorder body, at the attachment position of said body holding section, having an elongated groove having a generally U-shaped cross section to fit with said projection, said groove being provided on the bottom periphery of said recorder body and extending in the longitudinal direction of said recorder body.

26. The finger rest for a recorder as claimed in claim 25, wherein said projection has a longitudinal dimension less than the length of said groove so as to be received in said groove at different positions along the length of said groove to adjust the position of said body holding section along the longitudinal direction of said recorder body.

27. The finger rest for a recorder as claimed in claim 25, wherein:
said thumb supporting section comprises a plate-like member which has a plane substantially parallel to the cross section of said arc section of said body holding section; and
said plate-like member has a width W so as to extend over the bottom portion of said body holding section and over to said two side portions of said body holding section which define said arc section.

28. The finger rest for a recorder as claimed in claim 25, wherein said thumb supporting section projects from an end portion of said body holding section.

29. The finger rest for a recorder as claimed in claim 28, wherein the length of upper sides of said body holding section on both side portions is shortened compared to the length of said bottom portion of said body holding section by slantingly inclining said upper sides at an end opposing the end from which the thumb supporting section projects.

30. The finger rest for a recorder as claimed in claim 25, wherein said body holding section comprises a rib coupled between a bottom portion of said body holding section and a back surface portion of said thumb supporting section.

31. The finger rest for a recorder as claimed in claim 25, wherein said body holding section comprises a metal leaf spring integrally attached on an outer periphery of said body holding section, said metal leaf spring being curved as an arc.

32. The finger rest for a recording as claimed in claim 25, wherein said thumb supporting section projects from a central portion of said bottom portion of said holding section, and the upper sides of said body holding section are slantingly inclined on both side portions to leave the rest of said body holding section in a bell shape.

33. The finger rest for a recorder as claimed in claim 32, wherein upper longitudinally extending portions of said body holding section are curled outward to have respective rounded lips.

34. The finger rest for a recorder as claimed in claim 25, wherein upper longitudinally extending portions of said body holding section are curled outward to have respective rounded lips.

35. The finger rest for a recorder as claimed in claim 25, wherein said bottom portion of said body holding section has a notched portion in the shape of a U-shaped recess, and the inside of said notched portion is bent downward to form said thumb supporting section.

* * * * *